United States Patent
Marsal et al.

(10) Patent No.: US 10,046,482 B2
(45) Date of Patent: Aug. 14, 2018

(54) METHOD FOR MANUFACTURING A TURBOMACHINE BLADE MADE OF COMPOSITE MATERIAL

(71) Applicant: SAFRAN AIRCRAFT ENGINES, Paris (FR)

(72) Inventors: David Marsal, Saint Andre de Cubzac (FR); Clément Roussille, Bordeaux (FR); Jérémy Blachier, Bordeaux (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/551,424

(22) PCT Filed: Feb. 9, 2016

(86) PCT No.: PCT/FR2016/050281
§ 371 (c)(1),
(2) Date: Aug. 16, 2017

(87) PCT Pub. No.: WO2016/132042
PCT Pub. Date: Aug. 25, 2016

(65) Prior Publication Data
US 2018/0036914 A1    Feb. 8, 2018

(30) Foreign Application Priority Data
Feb. 16, 2015 (FR) .................... 15 51258

(51) Int. Cl.
*B29B 11/16* (2006.01)
*B29D 99/00* (2010.01)
(Continued)

(52) U.S. Cl.
CPC .............. *B29B 11/16* (2013.01); *B29C 70/24* (2013.01); *B29D 99/0025* (2013.01);
(Continued)

(58) Field of Classification Search
CPC .......... Y10T 29/49336; Y10T 29/49337; B29L 11/14; B29L 11/16; B29D 99/025
See application file for complete search history.

(56) References Cited

U.S. PATENT DOCUMENTS 5,222,297 A * 6/1993 Graff ..................... B29C 70/865
29/889.7
8,123,463 B2 * 2/2012 Kray ..................... F04D 29/023
156/175
(Continued)

FOREIGN PATENT DOCUMENTS

EP          2 500 548 A1    9/2012
WO   WO 2006/136755 A2   12/2006
(Continued)

OTHER PUBLICATIONS

International Preliminary Report on Patentability and then Written Opinion of the International Searching Authority as issued in International Patent Application No. PCT/FR2016/050281, dated Aug. 22, 2017.
(Continued)

*Primary Examiner* — Jason L Vaughan
(74) *Attorney, Agent, or Firm* — Pillsbury Winthrop Shaw Pittman LLP

(57) ABSTRACT

A method of fabricating a turbine engine blade out of composite material including fiber reinforcement densified by a matrix, the method including using multilayer weaving to make a first fiber that has a first portion forming a blade root preform and extended by a second portion, the second portion forming a tenon preform; using multilayer weaving to make a second fiber preform, the second preform including a first portion made up of two skins defining between them an internal housing, the first portion forming an airfoil preform, and a second portion extending from an outside surface of the skins, the second portion forming a platform (Continued)

preform; assembling the first preform with the second preform in the non-consolidated state by engaging the second portion of the first preform in the internal housing; and co-densifying the first and second preforms as assembled together in this way to obtain a turbine engine blade.

10 Claims, 6 Drawing Sheets

(51) Int. Cl.
 *B29C 70/24* (2006.01)
 *F01D 5/28* (2006.01)
 *F01D 11/00* (2006.01)

(52) U.S. Cl.
 CPC ............ *F01D 5/282* (2013.01); *F01D 11/008* (2013.01); *F05D 2300/603* (2013.01); *F05D 2300/6033* (2013.01)

(56) References Cited

U.S. PATENT DOCUMENTS

| | | | |
|---|---|---|---|
| 9,376,916 B2* | 6/2016 | McCaffrey | F01D 5/147 |
| 9,427,834 B2* | 8/2016 | Fremont | B29B 11/16 |
| 9,506,355 B2* | 11/2016 | Nunez | F01D 5/282 |
| 9,528,378 B2* | 12/2016 | Mateo | F01D 5/282 |
| 9,605,543 B2* | 3/2017 | Nunez | C04B 35/571 |
| 9,616,629 B2* | 4/2017 | Fabre | B29D 99/0025 |
| 9,790,802 B2* | 10/2017 | Herraiz | F01D 5/225 |
| 2011/0176927 A1* | 7/2011 | Alexander | F01D 5/28 |
| | | | 416/230 |
| 2011/0318513 A1* | 12/2011 | Marsal | B29B 11/16 |
| | | | 428/35.7 |
| 2013/0272893 A1* | 10/2013 | Fabre | B29C 70/24 |
| | | | 416/226 |
| 2016/0159460 A1* | 6/2016 | Laurenceau | B29D 99/0025 |
| | | | 416/226 |

FOREIGN PATENT DOCUMENTS

| | | |
|---|---|---|
| WO | WO 2012/001279 A1 | 1/2012 |
| WO | WO 2014/076408 A1 | 5/2014 |
| WO | WO 2014/087093 A1 | 6/2014 |

OTHER PUBLICATIONS

International Search Report as issued in International Patent Application No. PCT/FR2016/050281, dated Apr. 20, 2016.

* cited by examiner

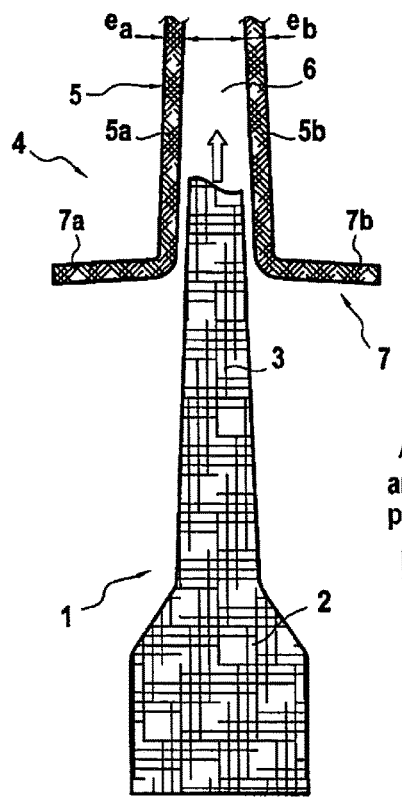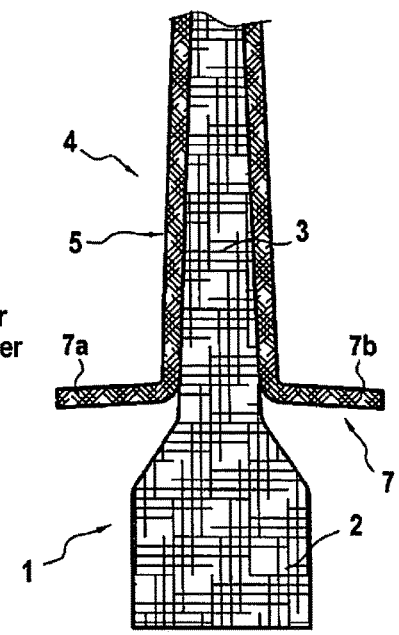
FIG.1 Assemble first and second fiber preforms together
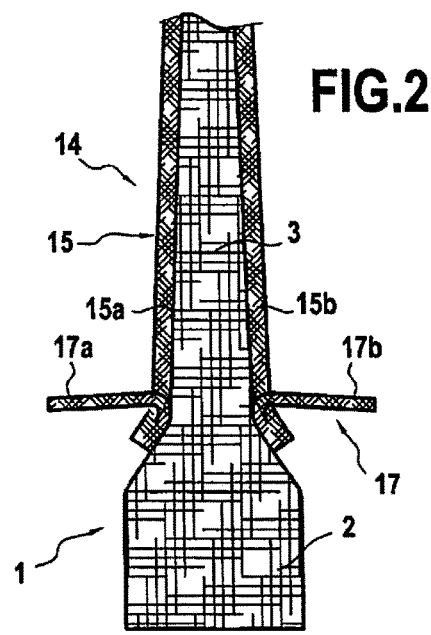
FIG.2
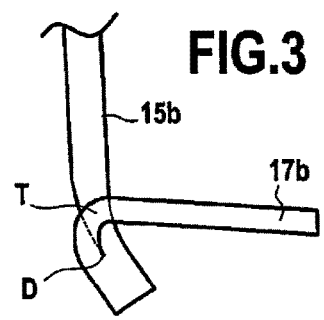
FIG.3

METHOD FOR MANUFACTURING A TURBOMACHINE BLADE MADE OF COMPOSITE MATERIAL

CROSS REFERENCE TO RELATED APPLICATIONS

This application is the U.S. National Stage of PCT/FR2016/050281 filed Feb. 9, 2016, which in turn claims priority to French Application No. 1551258, filed Feb. 16, 2015. The contents of both applications are incorporated herein by reference in their entirety.

BACKGROUND OF THE INVENTION

The invention relates to a method of fabricating a turbine engine blade made of composite material.

In turbine engines, it is known to make use of moving blades that are made of metal. It is desirable to replace such metal blades with blades made of a composite material in order to reduce the weight of such engines. Such replacement is particularly advantageous in that certain composite materials, such as ceramic matrix composite materials, are compatible with exposure to higher operating temperatures, thus enabling the performance of the engine to be improved.

At present, blades made of metal can be made by a casting method in which the top surface (head) and the bottom surface (platform) are cast at the same time as the airfoil and the root of the blade.

The inventors have sought to replace a metal material blade with a composite material blade presenting fiber reinforcement formed as a single part by weaving. Nevertheless, making a blade presenting all of the required secondary functions from a single textile preform presents a certain number of problems, in particular because of the difficulties encountered for making and shaping the textile preform.

Also known are Document WO 2012/001279, which describes a blade having an incorporated composite spar, and Document WO 2014/076408, which describes a fiber preform for a turbine engine blade obtained by a single piece of three-dimensional weaving.

There therefore exists a need to have novel methods enabling a turbine engine blade to be fabricated in simple manner out of composite material and presenting the desired properties.

OBJECT AND SUMMARY OF THE INVENTION

To this end, the invention provides a method of fabricating a turbine engine blade made of composite material comprising fiber reinforcement densified by a matrix, the method comprising:

using multilayer weaving to make a first fiber preform as a single piece, said first preform having a first portion forming a blade root preform and extended by a second portion of thickness smaller than the thickness of the first portion, said second portion forming a tenon preform;

using multilayer weaving to make a second fiber preform as a single piece, said second preform comprising a first portion made up of two skins defining between them an internal housing, said first portion forming an airfoil preform, and at least one second portion extending from an outside surface of said skins, said at least one second portion forming a platform preform;

assembling the first preform in the consolidated or non-consolidated state with the second preform in the non-consolidated state by engaging the second portion of the first preform in the internal housing of the first portion of the second preform; and co-densifying the first and second preforms as assembled together in this way in order to obtain a turbine engine blade.

Unless specified to the contrary, the thickness of a portion corresponds to the smallest transverse dimension of that portion.

A preform is said to be in the consolidated state when it has been subjected to a consolidation step during which its initial porosity has been filled in in part by depositing a consolidation phase, the preform in the consolidated state conserving residual porosity that may be filled in completely or in part during the subsequent step of co-densification. Various examples of consolidation methods are described in detail below. A preform is said to be in the non-consolidated state when it does not have such a consolidation phase. A preform in the non-consolidated state may be in the dry state or it may be impregnated with a precursor for a material of a consolidation phase, in which case consolidation has not yet been finalized as a result of the precursor not yet being transformed into a consolidation phase.

The invention relies on the first and second preforms being fabricated separately, each of which preforms performs a limited number of functions, thereby making each preform easier to shape and enabling them to be assembled together in order to form the preform that constitutes the fiber reinforcement of the blade that is to be made. By separating the functions of the blade over two fiber preforms, it becomes possible to simplify the textile definition of each of the first and second preforms, and also to facilitate any shaping they may require.

Thus, compared with the situation in which the blade is fabricated from a fiber preform made as a single piece, the invention enables the method of fabricating the blade to be simplified significantly. In addition, the second fiber preform takes up the extreme force values at the leading and trailing edges, and for example at the gas passage platform beside the root. Since this platform is bonded in textile manner to the skins forming the blade preform, its mechanical strength is improved, thereby giving good mechanical properties to the blade that is fabricated.

The first preform may advantageously constitute no more than a blade root preform together with a tenon preform. The blade root portion itself constitutes a portion that is subjected to particularly severe dimensional constraints, and it is thus particularly advantageous for a preform, specifically the first preform, to be devoted almost entirely to making the blade root portion, since making it is relatively difficult.

The blade as fabricated in this way can be used in a turbine or in a compressor of a turbine engine.

In an implementation, once the first and second preforms have been assembled together, the second preform need not extend along the first portion of the first preform that forms the blade root preform. In a variant, once the first and second preforms have been assembled together, the second preform may extend along all or part of the first portion of the first preform forming the blade root preform.

As described in greater detail below, the first and second preforms are not necessarily at the same stages of fabrication when they are assembled together.

In an implementation, the first preform may be consolidated before the assembly step and the first preform in the consolidated state may be assembled with the second preform in the non-consolidated state during the assembly step.

In a variant, the first preform in the non-consolidated state may be assembled with the second preform in the non-consolidated state during the assembly step.

In an implementation, said at least second portion of the second preform forming a platform preform may be made by weaving two sets of yarn layers, each passing respectively through one of the skins of the first portion of the second preform forming the airfoil preform.

In a variant, said at least second portion of the second preform forming the platform preform may be made by weaving extra length in the bottom portion of the first portion of said second preform forming the airfoil preform.

In an implementation, after the step of co-densifying the first and second preforms, the method may include a step of machining the airfoil preform so as to reduce the thickness of the skins.

In an implementation, the first preform may be obtained after multilayer weaving of a plurality of carbon fiber yarns, and the second preform may be obtained after multilayer weaving of a plurality of silicon carbide yarns. Under such circumstances, the first preform may be consolidated by a carbon-based consolidation phase prior to the assembly step, and the first preform as consolidated in this way may be assembled with the second preform in the non-consolidated state during the assembly step.

In an implementation, the first and second preforms may be co-densified by performing at least one of the following methods: chemical vapor infiltration; densification by a liquid technique; a melt-infiltration technique.

In an implementation, after the step of assembling together the first and second fiber preforms and before co-densification, the method may include a step of reinforcing the assembly, which step consists in introducing or forming mechanical bonds between the first and second preforms in their assembled-together portions.

BRIEF DESCRIPTION OF THE DRAWINGS

Other characteristics and advantages of the invention appear from the following description of particular implementations of the invention, given as non-limiting examples, and with reference to the accompanying drawings, in which:

FIG. 1 shows an overall example of first and second fiber preforms before and after being assembled together in the context of a method of the invention;

FIG. 2 shows another example of a structure that can be obtained by assembling together first and second fiber preforms in the context of a method of the invention;

FIG. 3 shows a detail of the structure shown in FIG. 2;

DETAILED DESCRIPTION OF IMPLEMENTATIONS

Figure 4:
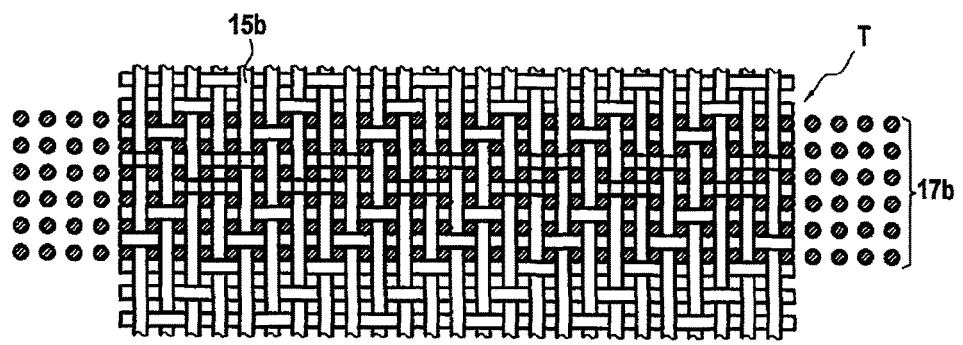
FIG. 4 is a fragmentary section view of FIG. 3 in the crossing zone.

FIG. 1 shows a first overall example of first and second fiber preforms 1 and 4. The first fiber preform 1 is constituted as a single piece obtained by multilayer weaving and comprises a first portion 2 forming a blade root that is extended by a second portion 3 presenting thickness that is smaller than the thickness of the first portion 2, said second portion 3 forming a tenon preform. The second fiber preform 4 is made as a single piece obtained by multilayer weaving and comprises a first portion 5 made up of two skins 5a and 5b defining between them an internal housing 6, said first portion 5 forming an airfoil preform, and the second portion 7 extending from the outside surfaces of said skins 5a and 5b, said second portion 7 forming a platform preform. In the example shown in FIG. 1, the second portion 7 of the second preform 4 forming a platform preform is made by weaving extra lengths 7a and 7b in the bottom portion of the first portion 5 of the second preform 4 that forms an airfoil preform. Independently of the intended implementation, and as shown in FIG. 1, the thickness $e_a$ of the first skin 5a and/or the thickness $e_b$ of the second skin 5b may be substantially constant along all or part of the first portion 5 of the second portion 4 forming the airfoil preform.

Once the first and second fiber preforms 1 and 4 have been obtained, they are subsequently assembled together by engaging the second portion 3 of the first preform 1 in the internal housing 6 of the first portion 5 of the second preform 4, the assembly direction being as represented by an arrow in FIG. 1. As described in greater detail below, during assembly, the first fiber preform 1 might be in the consolidated state, but it need not be in the consolidated state. In the example shown, once the first and second preforms 1 and 4 have been assembled together, the second preform 4 does not extend along the first portion 2 of the first preform 1 that forms the blade root. In other words, in the example shown, once the first and second preforms 1 and 4 have been assembled together, the first portion 2 of the first preform 1 forming the blade root preform is not received in the internal housing 6 of the second preform 4.

The structure obtained after assembly and shown in FIG. 2 differs from that shown in FIG. 1 insofar as the second portion 17 of the second preform 14 forming the platform preform is made by weaving two sets of yarn layers 17a and 17b, each crossing respectively through one of the skins 15a or 15b of the first portion 15 of the second preform 14 forming the airfoil preform. As in the example shown in FIG. 1, once the first and second preforms 1 and 14 have been assembled together, the second preform 14 does not extend along the first portion 2 of the first preform 1 that forms the blade root preform.

FIG. 3 shows a detail of the structure shown in FIG. 2. In order to make the platform preform, non-interlinking is organized at a non-interlinking point D so as to enable a set of yarn layers 17b forming a portion of the platform to be separated from a set of yarn layers forming one of the skins 15b of the first portion 15 of the second preform 14. The set of yarn layers 17b and the set of yarn layers forming one of the skins 15b are not interlinked in the non-interlinking zone. As shown in FIG. 3, the set of yarn layers 17b crosses through the skins 15b in a crossing zone T. A section view of the crossing zone T is shown in FIG. 4. The same characteristic's apply to the set of yarn layers 17a forming a portion of the platform and the set of yarn layers forming the skin 15a.

Figure 5:
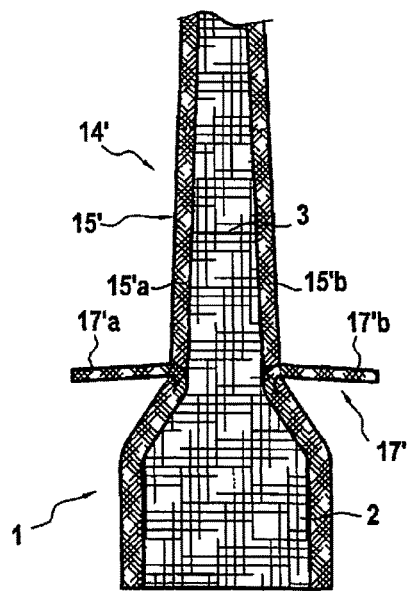
FIG. 5 shows another example of a structure that can be obtained by assembling together first and second fiber preforms in the context of a method of the invention.

FIG. 5 shows a variant example that differs from the example shown in FIG. 2 in that once the first and second preforms 1 and 14' have been assembled together, the second preform 14' extends all along the first portion 2 of the first preform 1 that forms the blade root preform. Under such circumstances, the first portion 2 of the first preform 1 is received entirely in the internal housing of the second preform 14'. The reference numerals for elements of the second preform 14' in FIG. 5 corresponds to those of FIG. 2 followed by a prime symbol ('). The details given in FIGS. 3 and 4 are valid for the example of FIG. 5.

Whatever the intended embodiment, in the context of a method of the invention, it is possible to form a plurality of platforms, possibly also with low walls and ribs. In particular, after performing a method of the invention, it is possible to obtain a turbine engine blade that includes a first platform situated beside the blade root and a second platform forming a blade head.

Figure 6:
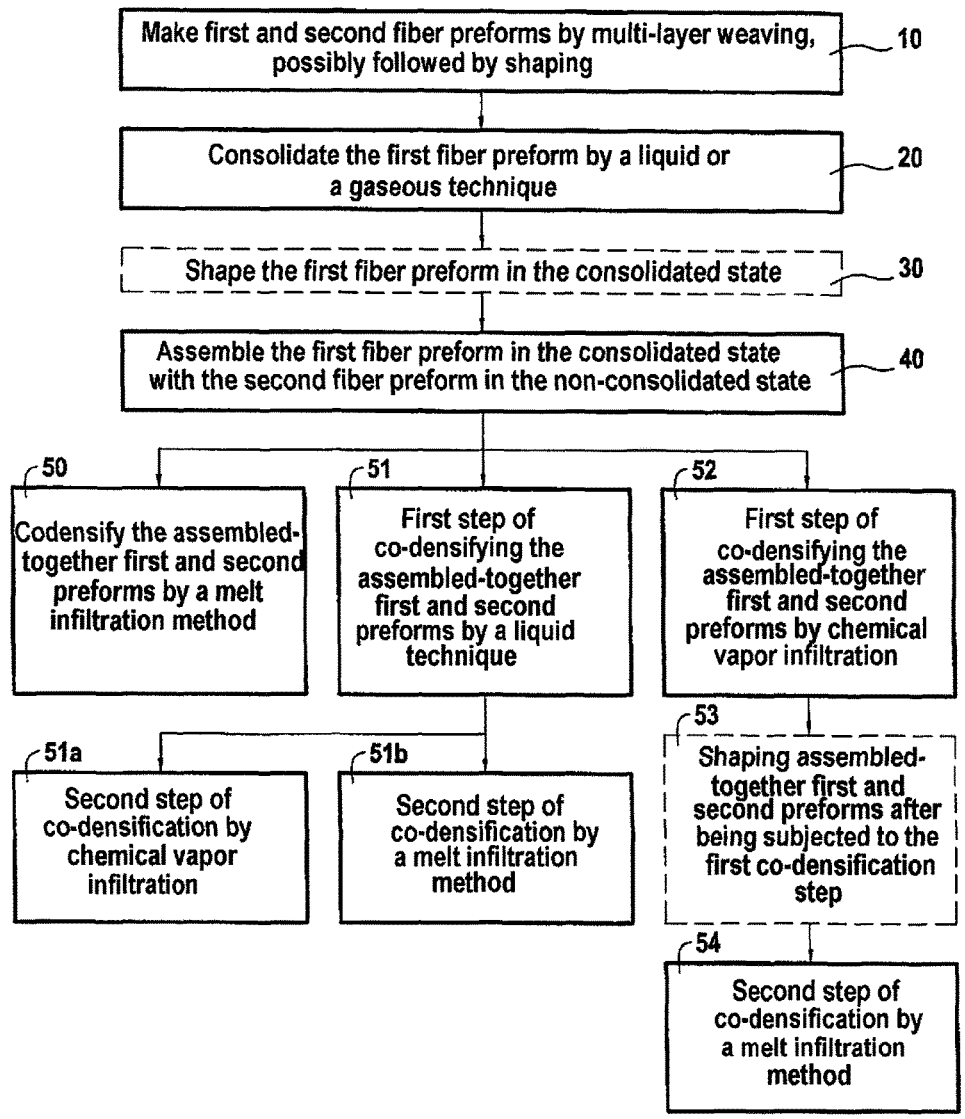
FIGS. 6 and 7 are flow charts showing in detail the various steps of implementations of methods of the invention.

There follows a description of implementations of the invention. The description below relates to a method of the invention as shown in FIG. 6.

Initially, each of the first and second fiber preforms is made by multilayer weaving between a plurality of warp yarn layers and a plurality of weft yarn layers, possibly followed by a shaping step (step 10). It would not go beyond the ambit of the invention for the first fiber preform to be obtained by multilayer weaving between a plurality of warp yarn layers and a plurality of weft yarn layers, with the second fiber preform being obtained by performing braiding.

The multilayer weaving that is performed may in particular be an "interlock" weave, i.e. a weave in which each weft yarn layer interlinks a plurality of warp yarn layers with all of the yarns in the same weft column having the same movements in the weave plane. Other types of multilayer weaving may be used. Various suitable kinds of multilayer weaving are described in particular in Document WO 2006/136755.

The weaving may be performed using warp yarns extending in the longitudinal direction of the preforms, it being observed that weaving with weft yarns in this direction is also possible.

In an implementation, each of the first and second fiber preforms may include carbon yarns, and may in particular be made of carbon yarns. In a variant, the first fiber preform may include carbon yarns, and may in particular be made of carbon yarns, while the second fiber preform may include ceramic yarns such as silicon carbide yarns, or may be made of such yarns. Also in a variant, each of the first and second fiber preforms may include ceramic yarns such as silicon carbide yarns, and may in particular be made out of such yarns.

Thus, in an implementation, the yarns used may be silicon carbide (SiC) yarns as supplied under the names "Nicalon", "Hi-Nicalon", or "Hi-Nicalon-S" by the Japanese supplier Nippon Carbon or "Tyranno SA3" by the supplier UBE, and by way of example they may have a weight (number of filaments) of 0.5 K (500 filaments).

The first fiber preform is then consolidated by depositing a consolidation phase in the pores of the first fiber preform, this consolidation phase being deposited in known manner by using a gaseous technique or a liquid technique (step 20).

The liquid technique consists in impregnating the preform with a liquid composition containing a precursor for the material of the consolidation phase. The precursor is usually in the form of a polymer, such as a resin, possibly diluted in a solvent. The preform is placed in a mold that may be closed in leaktight manner. Thereafter, the mold is closed and the liquid precursor for the consolidation phase (e.g. a resin) is injected into the mold in order to fill the preform.

The precursor is transformed into the consolidation phase by heat treatment, generally by heating the mold, and after eliminating the solvent, if any, and after curing the polymer.

When forming a ceramic consolidation phase, the heat treatment includes a step of pyrolyzing the precursor in order to form the consolidation phase out of ceramic material. By way of example, liquid precursors for ceramic, and in particular for SiC, may be resins of the polycarbosilane (PCS) or the polytitanocarbosilane (PTCS) or the polysilazane (PSZ) type. A plurality of consecutive cycles going from impregnation to heat treatment may be performed in order to achieve the desired degree of consolidation.

In the gaseous technique (chemical vapor infiltration (CVI) of the consolidation phase), the fiber preform is placed in an oven into which a reaction gas phase is admitted. The pressure and the temperature existing in the oven and the composition of the gas phase are selected in such a manner as to enable the gas phase to diffuse within the pores of the preform in order to form the consolidation phase therein by depositing a solid material within the material and in contact with the fibers as the result of a constituent of the gas phase decomposing or as a result of a reaction between a plurality of its constituents.

An SiC consolidation phase may be formed using methyltrichlorosilane (MTS), which gives SiC by decomposition of the MTS.

Once the first fiber preform has been consolidated, it may optionally be shaped, e.g. by machining (optional step 30).

The first fiber preform in the consolidated state is then assembled with the second fiber preform in the non-consolidated state by engaging the second portion of the first preform in the internal housing of the first portion of the second preform (step 40). Once the first and second preforms have been assembled together, it is possible optionally to perform a shaping step, e.g. by molding and in particular involving deformation so as to reproduce the curved profile of a blade airfoil, the first preform then constituting a countermold for the second preform.

Thereafter, the first and second preforms as assembled together in this way are co-densified.

In an implementation, the co-densification may be performed by a melt-infiltration method (step 50).

In this method, fillers are initially inserted in the pores of the first and second assembled-together preforms, e.g. reactive fillers that may for example be selected from SiC, $Si_3N_4$, C, B, and mixtures thereof. By way of example, the fillers may be inserted by means of a slurry cast, by sucking sub-micrometer particles through the preform, or by an injection method of the resin transfer molding (RTM) type in which heat treatment is performed after injection in order to evaporate the liquid medium.

Once the fillers have been inserted, the first and second preforms are then infiltrated with an infiltration composition in the molten state, e.g. comprising silicon so as to form a matrix and thus obtain the turbine engine blade. The infiltration composition may be constituted by molten silicon, or in a variant it may be in the form of a molten alloy of silicon and one or more other constituents. The constituent(s) present within the silicon alloy may be selected from B, Al, Mo, Ti, and mixtures thereof.

When reactive fillers are used, substantially all of the reactive fillers may be consumed during the reaction between the infiltration composition and the reactive fillers. In a variant, only a portion of the reactive fillers are consumed during this reaction.

In an implementation, the infiltration in the molten state that is performed serves to obtain a matrix by reaction between the solid fillers, e.g. of the C, SiC, or $Si_3N_4$ type as introduced using a slurry cast or as pre-impregnated, and a molten alloy placed on silicon. The reaction may take place at a temperature that is higher than or equal to 1420° C. Given the high temperatures involved, it may be advantageous for at least a portion of the first and second preforms to be made out of fibers that are stable at high temperatures, e.g. of the Hi-Nicalon or the Hi-Nicalon-S type.

Before infiltration of the infiltration composition, the yarns of the first and second preforms may be coated in an interphase layer, e.g. of BN or silicon-doped BN, and also in a carbide layer, e.g. of SiC and/or $Si_3N_4$, e.g. performed by the gaseous technique.

In a variant, it is possible initially to perform a first step of co-densifying the first and second assembled-together preforms by densification using a liquid technique (step 51), of the same type as the method described above concerning the step of consolidating the first fiber preform. The step 51 may then be followed by a second step of co-densification by chemical vapor infiltration (step 51a) (this type of method being as described above with reference to the step of consolidating the first fiber preform), or by infiltration in the molten state (step 51b). The second co-densification step is performed so as to fill in all or some of the residual pores that remain after performing the first co-densification step. Co-densification combining a liquid technique and a gaseous technique can advantageously serve to facilitate working, to limit costs, and to limit fabrication cycles, while nevertheless obtaining characteristics that are satisfactory for the intended utilization.

In another variant, it is possible to begin by performing a first step of co-densifying the assembled-together first and second preforms by chemical vapor infiltration (step 52). Step 52 may be followed by a shaping step, e.g. by machining (optional step 53). Thereafter, it is possible to perform a second co-densification step using a method of infiltration in the molten state (step 54).

Figure 7:
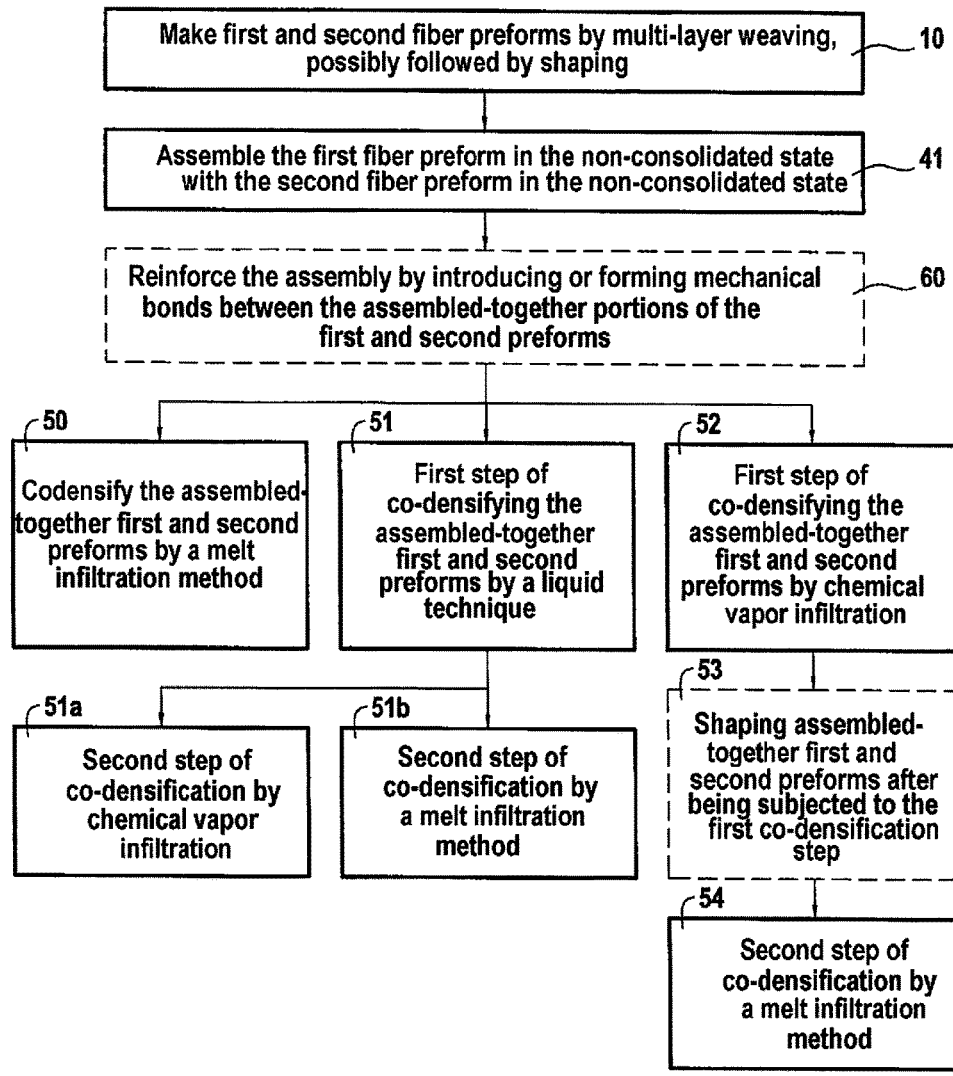

There follows a description of a variant of the method of the invention given with reference to FIG. 7. Initially, a step 10 as described above is performed. The first fiber preform in the non-consolidated state is then assembled with the second fiber preform in the non-consolidated state by engaging the second portion of the first preform in the internal housing of the first portion of the second preform (step 41). Once the first and second preforms are assembled together, it is optionally possible to perform a shaping step, e.g. by molding with deformation, in particular for the purpose of reproducing the curved profile of the blade airfoil. Thereafter, it is possible to perform a step of reinforcing the assembly by introducing or forming mechanical bonds between the first and second preforms via their portions that are assembled together (optional step 60). By way of example, this step of reinforcing the assembly may be performed by needling if the yarns constituting the first and second preforms are carbon yarns. In a variant, the step of reinforcing the assembly may be performed by a Z-pinning technique, regardless of the type of yarns constituting the first and second preforms.

Thereafter, co-densification is performed in the same manner as that described with reference to FIG. 6.

Whatever the selected implementation of the method of fabricating a turbine engine blade, after co-densification there may be an additional shaping step, e.g. by making cuts and/or a step of performing finishing treatments such as depositing at least one coating on the surface of the blade that has been formed.

Figure 8:
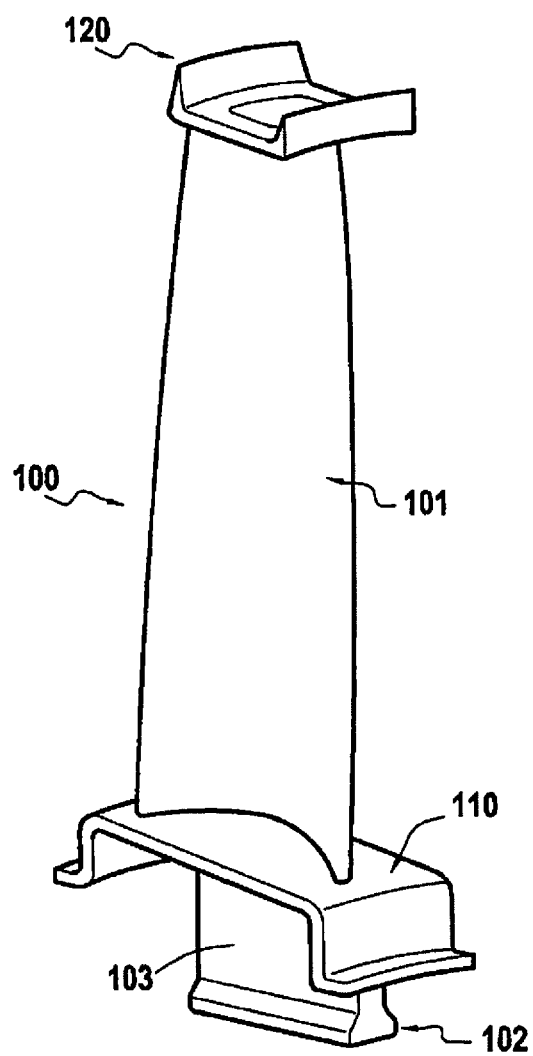
FIG. 8 is a perspective view of a turbine engine blade fabricated by a method of the invention.

FIG. 8 shows the structure of a turbine engine blade 100 that can be obtained by performing the method of the invention. The FIG. 8 blade 100 comprises in well-known manner an airfoil 101, a root 102 formed by a portion of greater thickness, e.g. having a bulb-shaped section, and extended by a tenon 103, a bottom platform 110 situated between the tenon 103 and the airfoil 101, and an outer platform or head 120 in the vicinity of the free end of the blade. The root 102 may be made out of thermostructural material of ceramic matrix or carbon/carbon composite type. It may be advantageous for the fiber reinforcement of the root 102 of the blade 100 to be made of carbon fibers, since they are lighter in weight than silicon carbide fibers, thus enabling the overall weight of the blade 100 to be reduced.

Figure 9:
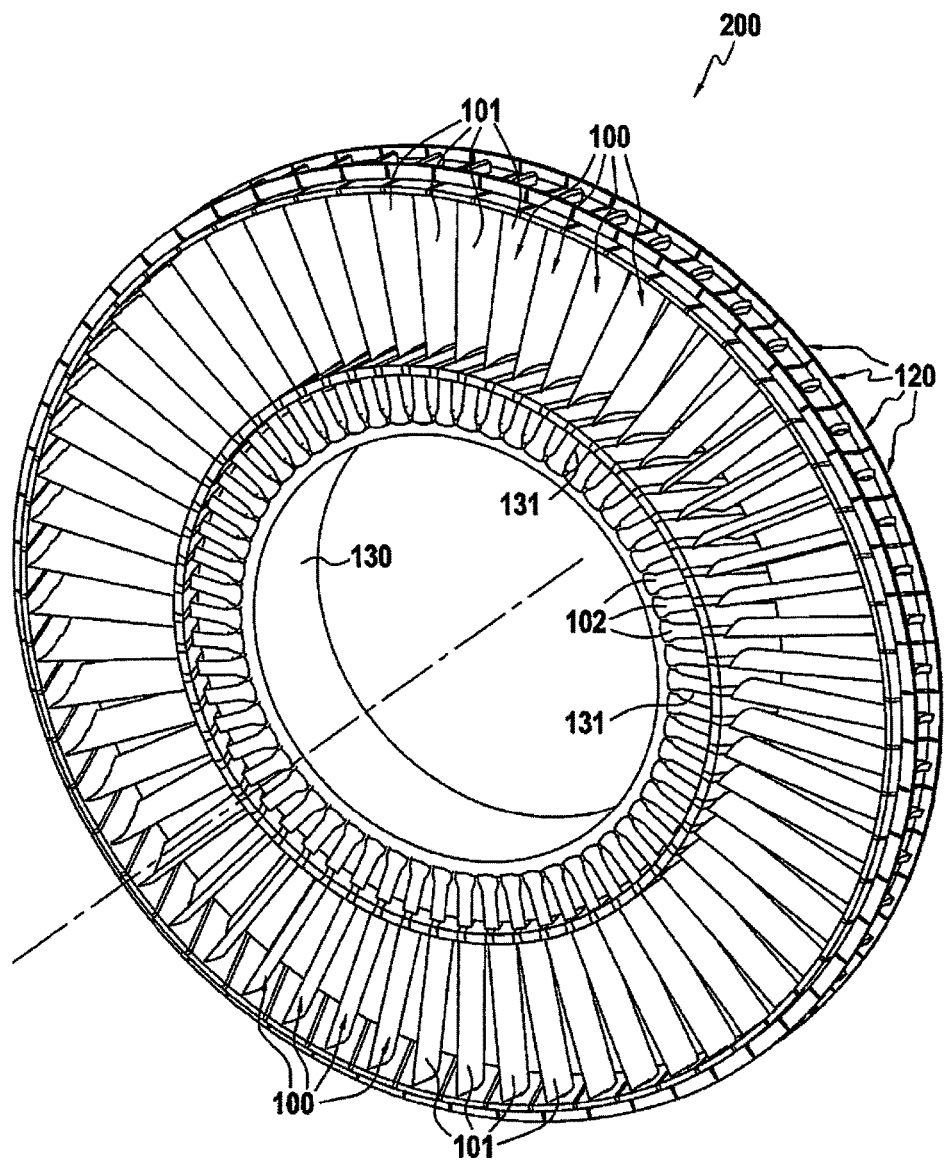
FIG. 9 is a perspective view of a turbine engine wheel fitted with a plurality of blades fabricated by performing the method of the invention.

FIG. 9 shows a turbine engine wheel 200 comprising a hub 130 having mounted thereon a plurality of blades 100 fabricated by a method of the invention, each blade 100 comprising an airfoil 101 and a root 102 formed by a portion of greater thickness, e.g. presenting a bulb-shaped section, that is engaged in a corresponding slot 131 formed in the periphery of the hub 130. The wheel 200 also includes a plurality of blade head elements 120 that are present on each of the blades 100.

Blades fabricated by a method of the invention may be mounted in low pressure or high pressure turbines of a turbojet. Blades fabricated by a method of the invention may also be fitted to gas turbines.

The term "lying in the range . . . to . . . " should be understood as including the bounds of the range.

The invention claimed is:

1. A method of fabricating a turbine engine blade made of composite material comprising fiber reinforcement densified by a matrix, the method comprising:
    using multilayer weaving to make a first fiber preform as a single piece, said first preform having a first portion forming a blade root preform and extended by a second portion of thickness smaller than the thickness of the first portion, said second portion forming a tenon preform;
    using multilayer weaving to make a second fiber preform as a single piece, said second preform comprising a first portion made up of two skins defining between them an internal housing, said first portion forming an airfoil preform;
    assembling the first preform in a consolidated or non-consolidated state with the second preform in a non-consolidated state by engaging the second portion of the first preform in the internal housing of the first portion of the second preform; and
    co-densifying the first and second preforms as assembled together in order to obtain a turbine engine blade;
    wherein the second preform comprises at least one second portion extending from an outside surface of said skins, said at least second portion forming a platform preform.

2. A method according to claim 1, wherein the first preform is consolidated before the assembly step and wherein the first preform in the consolidated state is assembled with the second preform in the non-consolidated state during the assembly step.

3. A method according to claim 1, wherein the first preform in the non-consolidated state is assembled with the second preform in the non-consolidated state during the assembly step.

4. A method according to claim 1, wherein said at least second portion of the second preform forming a platform preform is made by weaving two sets of yarn layers, each passing respectively through one of the skins of the first portion of the second preform forming the airfoil preform.

5. A method according to claim 1, wherein said at least second portion of the second preform forming the platform preform is made by weaving extra length in the bottom portion of the first portion of said second preform forming the airfoil preform.

6. A method according to claim 1, wherein, after the step of co-densifying the first and second preforms, the method further comprises machining the airfoil preform so as to reduce the thickness of the skins.

7. A method according to claim 1, wherein the first preform is obtained after multilayer weaving of a plurality of carbon fiber yarns, and wherein the second preform is obtained after multilayer weaving of a plurality of silicon carbide yarns.

8. A method according to claim 7, wherein the first preform is consolidated by a carbon-based consolidation phase prior to the assembly step, and wherein the first preform as consolidated in this way is assembled with the second preform in the non-consolidated state during the assembly step.

9. A method according to claim 1, wherein the first and second preforms are co-densified by performing at least one of the following methods: chemical vapor infiltration; densification by a liquid technique; a melt-infiltration technique.

10. A method according to claim 1, wherein, after the step of assembling together the first and second fiber preforms and before co-densification, the method further comprises reinforcing the assembly, which consists in introducing or forming mechanical bonds between the first and second preforms in their assembled-together portions.

* * * * *